United States Patent
Fisher et al.

(10) Patent No.: US 7,853,497 B2
(45) Date of Patent: Dec. 14, 2010

(54) SYSTEM FOR AND METHOD OF VARIABLE ANNUITY CONTRACT ADMINISTRATION

(75) Inventors: Charles G. Fisher, Scarsdale, NY (US); Bruce C. Long, Newport, RI (US); Donald P. Sullivan, Jr., Bethlehem, PA (US)

(73) Assignee: The Guardian Life Insurance Company of America, New York, NY (US)

( * ) Notice: Subject to any disclaimer, the term of this patent is extended or adjusted under 35 U.S.C. 154(b) by 0 days.

(21) Appl. No.: 11/202,243

(22) Filed: Aug. 12, 2005

(65) Prior Publication Data

US 2006/0111998 A1 May 25, 2006

Related U.S. Application Data

(62) Division of application No. 09/625,048, filed on Jul. 25, 2000, now Pat. No. 7,016,871.

(51) Int. Cl.
*G06Q 40/00* (2006.01)
(52) U.S. Cl. .................................... 705/35; 705/36 R
(58) Field of Classification Search ............... 705/1, 705/4, 35, 36 R
See application file for complete search history.

(56) References Cited

U.S. PATENT DOCUMENTS

| | | | | |
|---|---|---|---|---|
| 5,761,441 A | | 6/1998 | Bennett | 705/35 |
| 5,893,071 A | * | 4/1999 | Cooperstein | 705/4 |
| 6,275,807 B1 | | 8/2001 | Schirripa | 705/4 |
| 6,324,523 B1 | * | 11/2001 | Killeen et al. | 705/36 R |
| 6,345,261 B1 | | 2/2002 | Feidelson et al. | 705/14 |
| 6,411,939 B1 | * | 6/2002 | Parsons | 705/35 |
| 6,611,815 B1 | * | 8/2003 | Lewis et al. | 705/36 R |
| 7,089,201 B1 | * | 8/2006 | Dellinger et al. | 705/35 |
| 2001/0014873 A1 | * | 8/2001 | Henderson et al. | 705/35 |
| 2002/0046110 A1 | | 4/2002 | Gallagher | 705/14 |
| 2004/0177022 A1 | | 9/2004 | Williams et al. | 705/36 |
| 2004/0215493 A1 | | 10/2004 | Koppes et al. | 705/4 |

OTHER PUBLICATIONS

Donald Jay Korn, Financial Planning, pp. 65-68, Jun. 1, 2000, "Insurance—Signing Bonus: "Credit-enhanced" variable annuities, which give investors a little something extra for signing a contract, are shaking up that industry."*

Kelly Gruel, "Insurance firms rush to offer "bonus" VAs", Fund Marketing Alert, Jan. 11, 1999, vol. 4, Iss. 2; p. 1.*

(Continued)

*Primary Examiner*—Alexander Kalinowski
*Assistant Examiner*—Gregory Johnson
(74) *Attorney, Agent, or Firm*—Winston & Strawn LLP

(57) ABSTRACT

A system for and method of variable annuity contract administration is provided. Each variable annuity contract includes a bonus investment credit percentage, withdrawal charge percentages less than or equal to the bonus investment credit percentage in all contract years, and level asset-based compensation to distributors. In accordance with the invention, data relating to variable annuity contracts are stored in a memory means. A processing means is configured to read and manipulate the stored data to administer the variable annuity contracts from issuance to payout.

53 Claims, 12 Drawing Sheets

OTHER PUBLICATIONS

Lori Pizzani, "Fidelity Drops Surrender Charges", Annuity Market News, Oct. 1, 1999, p. 1-2.*

Anonymous, "Penn Mutual offers asset-based comp. on variable UL", National Underwriter, Oct. 27, 1997. vol. 101, Iss. 43; p. 1.*

James F Reeves, "Growing your practice beyond financial planning: The CPA as investment adviser", The CPA Journal; Sep. 1998; vol. 68, issue 9; pp. 1-3.*

Donald Jay Korn, Financial Planning, Jun. 1, 2000, 3 pages "Insurance—Signing Bonus: "Credit-enhanced" variable annuities, which give investors a little something extra for signing a contract, are shaking up that industry".*

Kelly Gruel, Fund Marketing Alert, Jan. 11, 1999, vol. 4, Iss. 2; 1 page "Insurance firms rush to offer "bonus" VAs".*

Lori Pizzani, Annuity Market News, Oct. 1, 1999, 2 pages "Fidelity Drops Surrender Charges".*

Anonymous, National Underwriter, Oct. 27, 1997. vol. 101, Iss. 43; 1 page "Penn Mutual offers asset-based comp. on variable UL".*

James F Reeves, The CPA Journal; Sep. 1998; vol. 68, issue 9; 3 pages "Growing your practice beyond financial planning: The CPA as investment adviser".*

American Banker, May 24, 1999, v 7, 2 pages "Credit-Enhanced Variable annuities Storm Market".*

Catherine Newton, Journal of Financial Planning; Mar. 1999; 12, 3; 7 pages "Weighing in on the variable annuity debate".*

Sondergeld, Eric, T., "Cashing In: The Other Side of Annuities", LIMRA'S Market Facts, Nov./Dec. 1995, vol. 14, Iss. 6, pp. 45-48.

Hargrave, Stanley, E., "An Update and More", Journal of Financial Planning, Denver, Oct. 1998, vol. 11, Iss. 5, pp. 36-38.

Koco, Linda, "New England Annuities Unit Unveils $4^{th}$ Generation VA," National Underwriter (Life, Health/Financial Services Ed.), Erlanger, Sep. 25, 1995, vol. 99, Iss. 29, pp. 11-13.

McDonnell, Steve, More VAs Introduce Liquidity Options During Annuitization, Annuity Insight Weekly, Apr. 20, 2001, Strategic Insight, www/sionline.com.

Office Action for U.S. Appl. No. 10/054,192 dated Dec. 12, 2007.
Office Action for U.S. Appl. No. 10/054,192 dated Mar. 13, 2009.
Office Action for U.S. Appl. No. 09/625,048 dated Apr. 7, 2004.
Office Action for U.S. Appl. No. 09/625,048 dated Sep. 20, 2004.
Office Action for U.S. Appl. No. 09/625,048 dated Jun. 4, 2003.
U.S. Appl. No. 10/054,192, filed Jan. 22, 2002; Inventor: Charles Gordon Fisher, III; Title: System For And Method Of Individual Annuity Payout Administration.

* cited by examiner

SYSTEM FOR AND METHOD OF VARIABLE ANNUITY CONTRACT ADMINISTRATION

CROSS REFERENCE TO RELATED APPLICATION

This application is a divisional of U.S. application Ser. No. 09/625,048 filed Jul. 25, 2000, now U.S. Pat. No. 7,016,871 the entire content of which is incorporated herein by reference thereto.

BACKGROUND OF THE INVENTION

1. Field of the Invention

The present invention relates to the financial vehicle known as the variable annuity contract. More particularly, the present invention relates to a system for and method of variable annuity contract administration.

2. Description of the Prior Art

When an individual retires and no longer collects a salary, he or she needs a way to be able to maintain the same quality of living as he or she enjoyed prior to retirement. Through the purchase of annuity contracts, individuals are provided with an opportunity to meet their retirement needs. As those of ordinary skill in the art know, an annuity is an insurance contract issued by an insurance company whereby the contractowner can obtain future payments based on the value at retirement of amounts paid into the annuity by the contractowner. Depending upon the payout option chosen, this stream of payments can be for life, for life with a period certain, for a certain period of time, etc. There are many payout options available with annuities.

There are generally two types of individual annuities, fixed and variable. With a fixed annuity, interest will accrue on monies paid in by the contractowner at a rate set by the insurance company during the accumulation phase. Taxes are deferred on the accumulated interest and annuity payout options are available. With a variable annuity, the contractowner can make deposits into a variety of mutual find subaccounts offered through the annuity, defer the taxes on income and gains from these funds, and convert the funds to an income stream for the rest of the contractowner's lifetime. In recent years, the variable annuity has become the more popular type of annuity contract.

A variable annuity contract has two phases. The first phase of the contract is the accumulation phase of the contract. The second phase of the contract is the payout phase of the contract. During the accumulation phase of a variable annuity, deposits can typically be made regularly or at the discretion of the contractowner and directed into any number of the underlying mutual fund subaccounts. Further, these balances can be moved from one fund to another at the discretion of the contractowner. Generally, a death benefit is also provided which pays the greater of the accumulation value of the contract or the total premiums paid into the contract less any withdrawals taken. There are also other, more liberal, death benefits in many contracts.

In the payout phase, the contractowner has a choice of a number of different payout options. For example, the payout may be a life annuity with a guaranteed period or a life annuity with period certain. The various payout options protect the contractowner from the adverse consequences of living too long and outliving his or her money.

As the variable annuity has evolved and as variable annuities have become more popular, there have been many innovations in this area. Various types of death benefits, living benefits, guaranteed minimum income benefits, bonus investment credits for the contractowners at issue, disability benefits, etc., have been developed. In the current variable annuity contract marketplace, there are many different variable annuity contracts with many different features, and it is expected that there will continue to be many innovations in the variable annuity field and many more additional product features in the future.

A recent innovation in the field of variable annuities has been a bonus investment credit. A bonus investment credit is money that is paid into the annuity by the insurance company which issues the annuity contract at the time premium payments are made. The bonus investment credit is usually some percent of the premium that is paid into the contract by the contractowner. For example, with a 3% bonus investment credit, if a deposit of $100,000 is made by the contractowner, an additional $3,000 would be credited by the insurance company to the contract. The bonus investment credit has proved in the marketplace to be a valuable feature to potential contractowners. However, the implementation of the bonus investment credit in an annuity contract has typically resulted in higher penalties for withdrawals of money from the annuity by the contractowner.

Another area which has evolved in the variable annuity marketplace is the payment of commissions to distributors who sell variable annuities. Commissions can be paid to distributors up-front on premium deposits, partially up-front and partially in the renewal years, or as asset-based compensation. Asset-based compensation is defined as compensation which is paid as a percentage of the accumulated value of the contract. However, in the first year, the compensation will be paid as a percentage of the premium paid. This is because during the first year the premium has not had time to accumulate significantly and thus there will be no substantial difference between the premium paid and the assets of the contract.

From the contractowner's point of view, assuming that the compensation is actuarially equivalent, annuities that pay asset-based compensation to distributors are generally better. For example, assume that the commission is paid up-front and that there is no further compensation forthcoming from the contract to the distributor. In that situation, the distributor might try to convince the contractowner to move the money that is in his or her current annuity contract to a different annuity contract, thereby entitling the distributor to another up-front commission payment. This would often not be in the best interests of the contractowner as the contractowner would have a new set of withdrawal charges with the new contract.

With respect to commissions, annuities can generally be categorized into two classes: (1) those annuities which pay commissions to distributors and (2) those annuities which do not pay commissions and are sold directly to contractowners through 800 numbers, over the Internet, etc. While, in general, annuities that do not pay commissions are cheaper for the contractowner, the contractowner of the annuity that pays commissions receives service and guidance from the distributor and thereby, theoretically speaking, is able to make better informed decisions concerning the variable annuity and his or her retirement needs.

Bonus investment credits have been particularly popular with prospective contractowners with both the class of annuities that pays commissions and the class of annuities that does not pay commissions. Within the class of annuities that pays commissions, there are a number of annuities that pay a bonus investment credit. However, currently all of these annuities have withdrawal charge percentages that are higher than the bonus investment credit percentage that is provided to the contractowner and that are considered to be high in the annuity marketplace.

Withdrawal charges are a feature of variable annuities that should be closely examined by a prospective contractowner. Withdrawal charges are a percentage of the amount withdrawn and apply for a certain period of time. Significant penalties for withdrawals and long periods of time for which withdrawal penalties apply are features of variable annuity contracts which can limit the flexibility of the contractowner. For example, in the case of a variable annuity that has a bonus investment credit and that pays commissions, typical withdrawal charges would range from 6% to 9% of the amount withdrawn in the first year and would apply for a period from six to ten years. The withdrawal charges would decrease over the period of time during which charges apply.

Although there are many different types of variable annuity contracts in the marketplace, there has not been a variable annuity contract designed to pay a bonus investment credit to the contractowner where (1) the withdrawal charge percentages in all contract years are less than the bonus investment credit percentage and (2) commissions are paid to distributors. Currently, variable annuity contracts that pay commissions and have a bonus investment credit also have withdrawal charge percentages that are significantly greater than the bonus investment credit percentage. There are also commission-paying variable annuity contracts that have lower withdrawal charges but that do not have a bonus investment credit. Neither of these options would be as attractive to a prospective contractowner as a variable annuity that includes both a bonus investment credit and withdrawal charges which are not greater than the bonus investment credit.

It is clear from the foregoing discussion that variable annuity contracts are complex insurance vehicles. Because of this complexity, it is desirable to provide a system and method which can be used to facilitate the administration of variable annuity contracts expeditiously and efficiently. Additionally, because of the large amount of competition among issuers in the variable annuity market, it is desirable to provide a system for and method of administering variable annuity contracts which are more efficient and consumer-oriented than other variable annuity contacts in order to attract more would-be contractowners and thereby gain a competitive advantage in the marketplace.

SUMMARY OF THE INVENTION

Accordingly, it is an object of the present invention to provide a system for and method of administration of variable annuity contracts. It is a further object of the present invention to provide a system for and method of administration of variable annuity contracts wherein the variable annuity contract is more efficient and more consumer-oriented than other variable annuity contracts in the marketplace. It is a further object of the present invention to provide a system for and method of administration of variable annuity contracts wherein the variable annuity includes a bonus investment credit, withdrawal charge percentages which are less than or equal to the bonus investment credit percentage, and level asset-based compensation to distributors. Other objects will become apparent from the following discussion.

The foregoing and other objects of the present invention are achieved through a novel and non-obvious system for and method of administering variable annuity contracts wherein each variable annuity contract includes a bonus investment credit, withdrawal charge percentages which are less than or equal to the bonus investment credit percentage in all contract years, and a level asset-based compensation structure. In accordance with one aspect of the present invention, a system is provided which includes memory means for storing variable annuity contract data and processing means for administering all aspects of the variable annuity contract from issuance to payout based on the stored contract data.

The present invention will now be described in greater detail, with frequent reference being made to the drawings identified below in which identical numerals represent identical elements.

DETAILED DESCRIPTION OF THE PREFERRED EMBODIMENT

Figure 1:
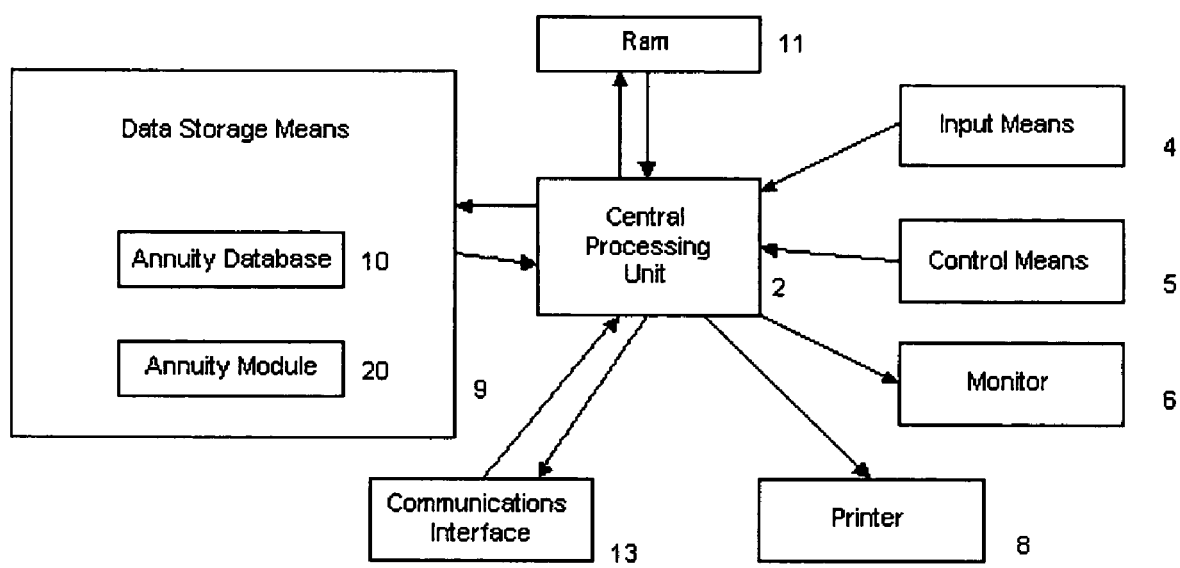
FIG. 1 is a block diagram of a system in accordance with one embodiment of the present invention.

The following description is presented to enable any person of ordinary skill in the art to practice the present invention. Various modifications to the preferred embodiment will be readily apparent to those of ordinary skill in the art, and the principles defined herein may be applied to other embodiments and applications without departing from the spirit and scope of the present invention and appended claims. Thus, the present invention is not intended to be limited to the embodiment shown, but is to be accorded the broadest scope consistent with the principles and features disclosed herein.

As discussed above, the present invention relates to a system for and method of administering variable annuity contracts. In accordance with the present invention, a variable annuity contract includes a bonus investment credit, withdrawal charge percentages less than or equal to the bonus investment credit percentage, and level asset-based compensation paid to the distributor. While the amounts of the bonus investment credit percentage, withdrawal charge percentages and compensation percentage will vary from issuer to issuer depending on in-house financial and actuarial calculations, in the preferred embodiment the bonus investment credit will be 3% of the premium paid in the first contract year; the withdrawal charges will be 3% of the withdrawal value in the first contract year, 2% in the second contract year, 1% in the third contract year, 1% in the fourth contract year, and 0% for the fifth year and after, and premium payments made in the second contract year and later will not be subject to a withdrawal charge; and the compensation structure will be 1% of the premium paid in the first contract year and 1% of the accumulated account value of the contract for each year thereafter payable on a quarterly basis. Because of the combination of level (i.e., the same percentage in each contract year) asset-based compensation with the bonus investment credit, it is possible to provide contractowners with withdrawal charge percentages less than or equal to the bonus investment credit percentage in all contract years, thereby enabling contractowners to fund and manage their retirement needs in an efficient manner.

A variable annuity contract which may be used in accordance with the present invention is attached hereto as Appendix A. However, those of ordinary skill in the art will appreciate that the present invention is not limited to use in connection with the variable annuity contract attached hereto as Appendix A, but may be used in connection with any variable annuity contract, as long as (1) there is a bonus investment credit, (2) the withdrawal charge percentages are less than or equal to the bonus investment credit percentage in all contract years, and (3) the compensation to distributors is level and asset-based. The copyright in the variable annuity contract attached hereto as Appendix A is owned by The Guardian Life Insurance Company of America and no license is granted herein to make copies of the variable annuity contract except as an appendix to a United States patent which issues hereon.

Referring to FIG. 1, a block diagram of a system in accordance with one embodiment of the present invention is shown. The system includes a central processing unit (CPU) 2 for controlling the operation of the system; input means 4 operatively coupled to the CPU 2, such as a keyboard, floppy drive, tape drive, computer network interface, etc., or any combination thereof, for inputting variable annuity contract data into the system; control means 5, such as a keyboard and/or mouse, for allowing a user to control the operation of the system; a monitor 6 and printer 8 for system output; data storage means 9, such as a hard disk drive or tape drive or other memory means, operatively coupled to the input means 4 and CPU 2, including an Annuity Database 10 for storing variable annuity contract data for use by the Annuity Module 20 relating to administration of the contracts. This contract data includes but is not limited to the bonus investment credit percentage of the contract, the withdrawal charge percentages of the contract, and the asset-based compensation percentage. The Annuity Database 10 is also used for storing data relating to each particular variable annuity contract administered by the system, including but not limited to, the name of the contractowner, the date of birth of the contractowner, the sex of the contractowner, the address of the contractowner, the name of the annuitant, the date of birth of the annuitant, the sex of the annuitant, the address of the annuitant, the contract purchase date, the amount of premium paid by the contractowner and the dates of payment thereof, the beneficiary named in the contract, the selected mutual fund subaccount allocations of the annuity, the number of fund units for each mutual fund subaccount, the payout option selected by the contractowner including the annuitization date, whether a rider is chosen and what the terms of the rider are, and data relating to any events associated with each contract, such as data relating to any withdrawal made by a contractowner. The contractowner alone has the right to receive all benefits of the annuity contract and to exercise all the rights that the annuity contract grants. The annuitant, who may or may not be the contractowner, is designated in the application for the annuity contract. All monthly annuity payments are based on the sex and age of the annuitant. The death benefit of the annuity contract is also payable on the death of the annuitant.

The data storage means 9 further includes an Annuity Module 20 which includes instructions to be executed by the CPU 2 for administering annuity contracts based on data stored in the Annuity Database 10. The system also includes a random-access-memory (RAM) 11 which may be used in addition to or in combination with the data storage means 9 to store contract data; and a communications interface 13, such as a modem or network card, which can be used to communicate with other computers and computer networks.

In practice, the system will typically take the form of a personal computer running MS-DOS or Windows, but may take the form of a workstation, a mainframe computer, a mid-range computer, or any other apparatus that can be configured to perform the functions described herein. The software described herein, including the Annuity Module 20, may be written in any programming language that is compatible with the system.

Figure 2:
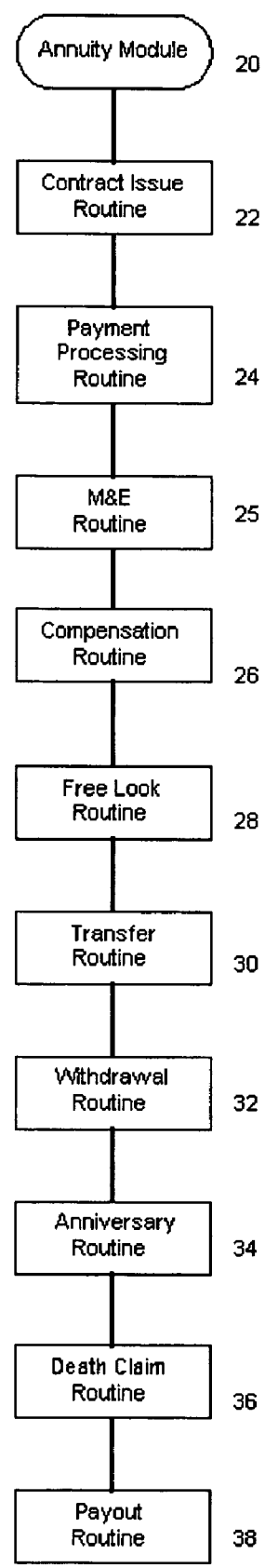
FIG. 2 is a block diagram of an Annuity Module in accordance with one embodiment of the present invention.

Referring to FIG. 2, a block diagram of the Annuity Module 20 is provided. The Annuity Module 20 includes a Contract Issue Routine 22 which is used to issue new annuity contracts; a Payment Processing Routine 24 which is used to process premium payments; an M&E Routine 25 which is used to assess mortality and expense risk charges and administrative charges on each contract on a daily basis; a Compensation Routine 26 which is used to calculate compensation payments; a Free Look Routine 28 which is used to process contract returns; a Transfer Routine 30 which is used to transfer annuity monies between mutual fund subaccounts; a Withdrawal Routine 32 which is used to calculate withdrawal charges when money is withdrawn from an annuity by a contractowner; an Anniversary Routine 34 which is used to calculate annual contract fees; a Death Claim Routine 36 which is used to calculate the death benefit and pay the beneficiary when the annuitant dies; and a Payout Routine 38 which is used to calculate and make annuity payments once the contract is annuitized.

Figure 3:
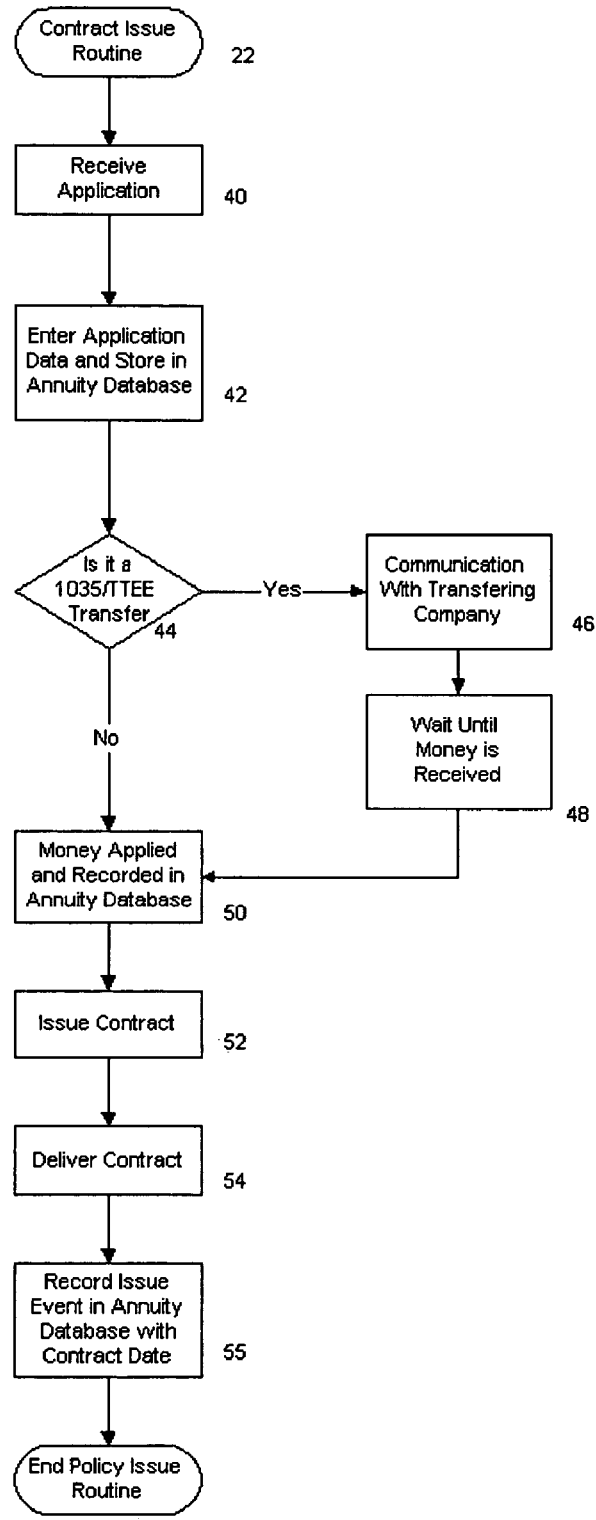
FIG. 3 is a flow chart illustrating the operation of the Contract Issue Routine of the Annuity Module of FIG. 2.

Referring to FIG. 3, a flow chart of the Contract Issue Routine 22 is provided. The contract issuance process begins when a new application has been received from a prospective contractowner 40. Upon receipt of this application, various data is entered into the system 42 via the input means 4, including, but not limited to, the name of the contractowner, the address of the contractowner, the date of birth of the contractowner, the sex of the contractowner, the name of the annuitant, the address of the annuitant, the date of birth of the annuitant, the sex of the annuitant, the premium paid by the contractowner, the contract beneficiary, the selected fund subaccount allocations of the annuity, what riders, if any, have been chosen, and whether a 1035/Trustee to Trustee transfer is involved. The data will typically be input into the system by hand via a keyboard, although the information may be electronically uploaded to the system via floppy disk, tape drive, computer network, etc. The application data is stored in the Annuity Database 10.

Following the input and storage of data 42, the Contract Issue Routine 22 determines from the application information whether a 1035/Trustee to Trustee transfer is involved 44. A 1035/Trustee to Trustee transfer is an exchange of an annuity contract from one insurer for a new contract with a second insurer. A 1035 exchange involves non-qualified money, and a Trustee to Trustee exchange involves qualified money such as an IRA or pension plan. If a 1035/Trustee to Trustee transfer is involved, a communication, either electronically or non-electronically, is initiated with the company that currently has the contractowner's money 46. The system then waits until the money has been received 48. Once the money has been received, either from the contractowner or from another company, it is applied to the contractowner's account and recorded in the Annuity Database 50. A new contract is then issued 52 and delivered to the contractowner by mail or other means 54. The contract issue event is then recorded in the Annuity Database 10 along with the contract issue date 55.

Figure 4:
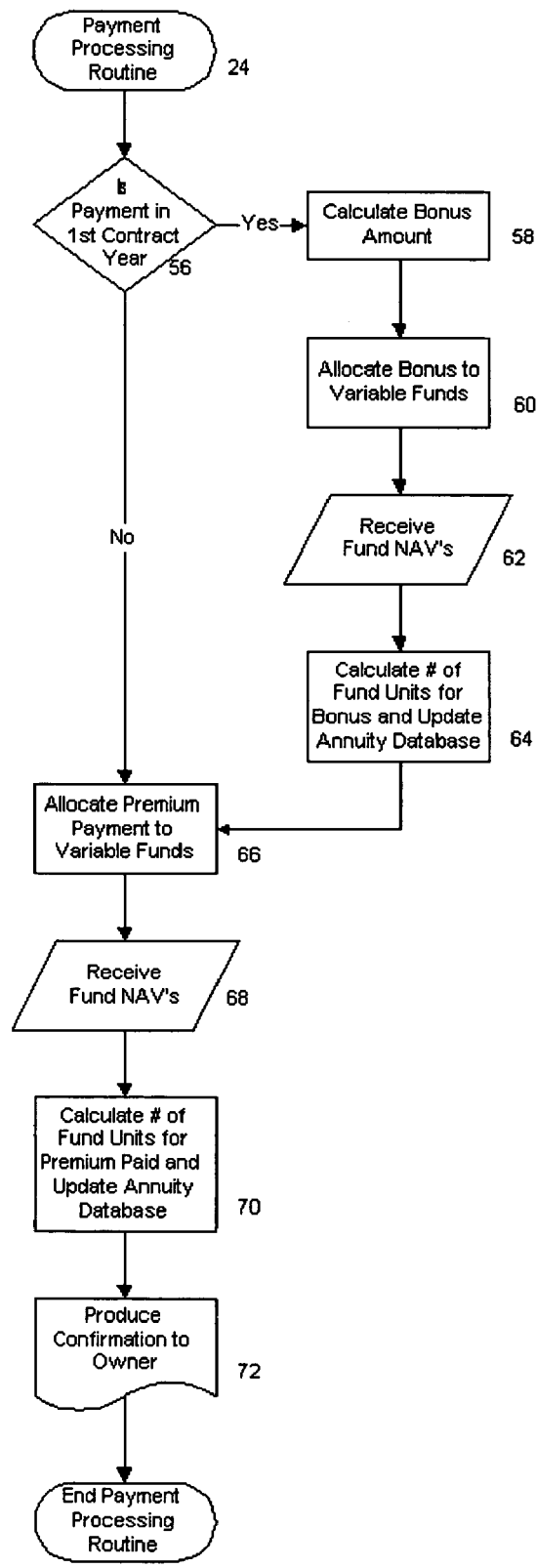
FIG. 4 is a flow chart illustrating the operation of the Payment Processing Routine of the Annuity Module of FIG. 2.

Once a new contract has been issued, the contractowner can make premium payments. As indicated above, these payments are processed by the Payment Processing Routine 24. A flowchart of the Payment Processing Routine 24 is provided in FIG. 4. Upon receipt of a payment, the Payment Processing Routine 24 first determines if the payment is received in the first contract year 56. If the payment is received in the first contract year, the amount of the bonus investment credit to be credited to the contract is calculated 58 based on the percentage figure stored in the Annuity Database 10. As indicated above, this bonus investment credit is preferably 3% of the premium payment. Once the Payment Processing Routine 24 has calculated the bonus amount 58, the bonus amount is allocated to the various mutual fund subaccounts selected by the contractowner 60. The fund net asset values (NAVs) for each mutual find selected by the contractowner are then retrieved, typically from the computer system of an organization which provides these values on a daily basis via the communications interface 13, and the number of fund units for each selected mutual fund subaccount is calculated by dividing the NAV for each mutual fund into the corresponding allocated bonus amount and the subaccount information in the Annuity Database 10 is updated accordingly 64. The Payment Processing Routine 24 then electronically allocates the premium paid into the various mutual fund subaccounts 66. After receiving the fund NAVs 68, the Payment Processing Routine calculates the number of fund units for the premium that has been paid and updates the subaccount information in the Annuity Database 70. The final step of the Payment Processing Routine 24 is to produce a confirmation statement 72 on the printer 8, which is mailed to the contractowner.

Figure 12:
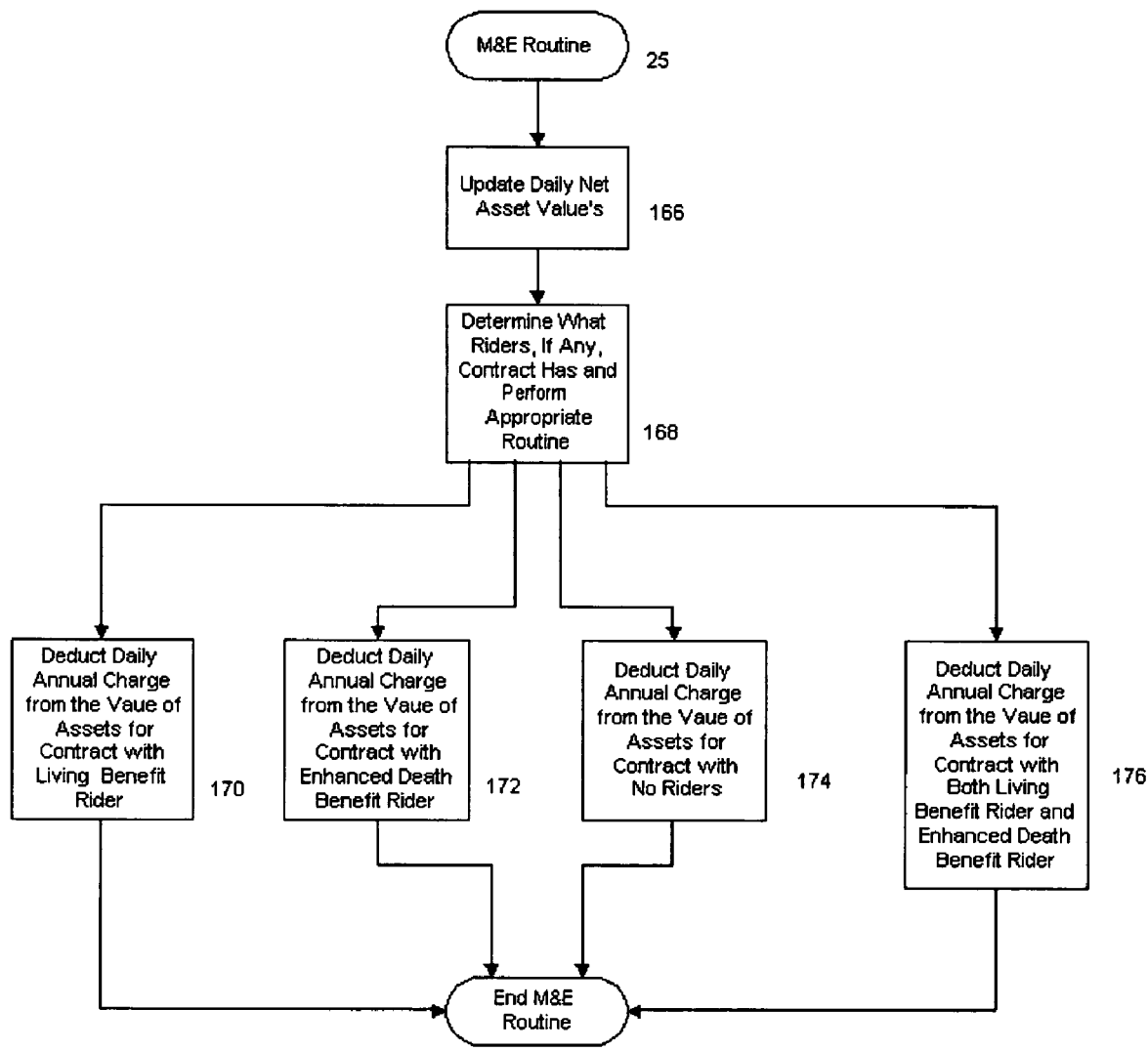
FIG. 12 is a flow chart illustrating the operation of the M&E Routine of the Annuity Module of FIG. 2.

With respect to the M&E Routine 25, it is necessary in the variable annuity industry for issuers to assess a daily mortality and expense risk ("M&E") charge to each contractowner. In addition, a number of companies assess an administrative charge to each contractowner. The mortality and expense risk charge and the administrative charge are typically a small percentage of the accumulated account value, typically on the order of 1.25% to 1.85% depending on the issuer. Referring to FIG. 12, the M&E Routine first determines the accumulated account value 166 by multiplying the number of fund units for each mutual fund subaccount as recorded in the Annuity Database 10 by the corresponding updated daily NAV. The results are then summed to arrive at a total account value. A determination is then made as to what riders, if any, are included in the contract 168. The appropriate mortality & expense risk charge and administrative charge are then calculated as a percentage of the accumulated account value and deducted from the account value of the contract 170-176.

Figure 5:
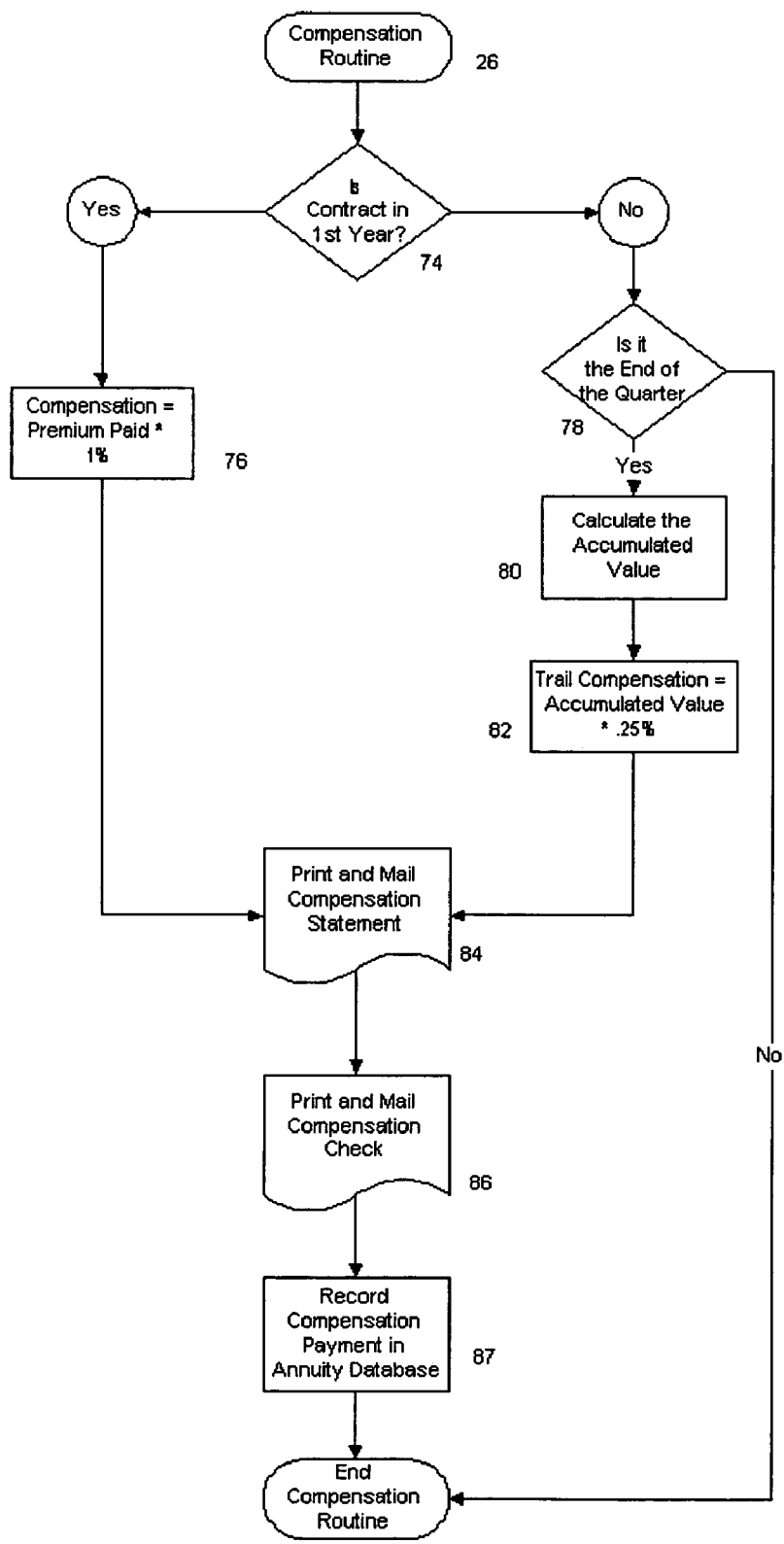
FIG. 5 is a flow chart illustrating the operation of the Compensation Routine of the Annuity Module of FIG. 2.

As indicated above, the variable annuity has associated level asset-based compensation which is paid out to the distributor that sold the contract to the contractowner. This compensation is calculated and paid by the Compensation Routine 26. A flow chart of the Compensation Routine 26 is shown in FIG. 5. Upon activation, the Compensation Routine 26 will first determine whether or not the contract is in the first year 74. If the contract is in the first year, the commission is calculated as 100 basis points (i.e., 1%) of the premium paid in the first contract year 76. If the contract is not in the first year, then asset-based compensation is paid at the end of each contract quarter. Therefore, the system will have to determine if it is the end of a contract quarter 78. If it is not the end of a contract quarter, no compensation is paid and the Compensation Routine 26 is terminated. If it is the end of a contract quarter, the accumulated value of the contract needs to be calculated 80. Since asset-based compensation is paid on a quarterly basis, the compensation is calculated as the accumulated value of the contract multiplied by 25 basis points (¼ of 100 basis points) on the quarterly anniversary 82. If compensation is being paid, a compensation statement 84 and compensation check 86 are printed out and mailed to the person or entity receiving the compensation. The compensation payment is then recorded in the Annuity Database 87.

Figure 6:
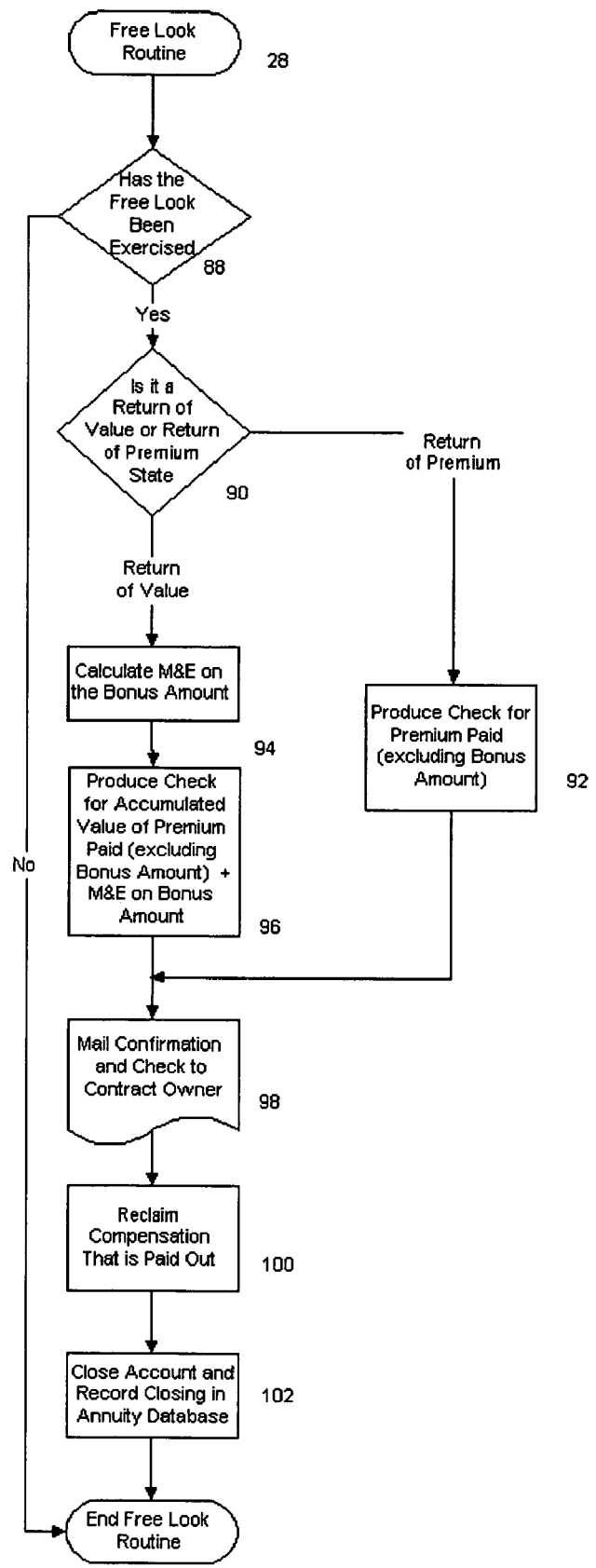
FIG. 6 is a flow chart illustrating the operation of the Free Look Routine of the Annuity Module of FIG. 2.

All variable annuity contracts have an associated free look period. During this period, which typically runs ten days from the date of contract issuance, the contractowner may return the contract for full reimbursement. The Free Look Routine 28 is used to process contract returns during the free look period. A flow chart of the Free Look Routine 28 is provided in FIG. 6. The first step in the Free Look Routine 28 is to check the Annuity Database 10 to determine whether the free look provision has been exercised 88 by the contractowner. If it has not, then the Free Look Routine 28 is terminated. If it has been exercised, then a determination of how much money is returned to the contractowner is made. There are two different ways to determine how much money is to be returned: (1) the return of value method and (2) the return of premium method. The method used is determined by the jurisdiction in which the contract was issued as the applicable laws vary from state to state 90. If the state is a return of premium state, the premium amount that was paid in is returned to the contractowner 92.

If, on the other hand, the state is a return of value state, then the accumulation value of the contract on the day the free look option is exercised minus the value of any bonus investment credits plus any mortality and expense risk charges that may have been charged on the bonus amount is the value returned to the contractowner. The Free Look Routine 28 thus determines any mortality and expense risk charges that were charged on the bonus amount 94 and generates a check for the return amount 96. The check and a confirmation statement are then mailed out to the contractowner 98. Any commissions that were paid will also have to be reclaimed from the distributor 100. The account will then be closed out and no additional processing will be done 102. The account closing is recorded in the Annuity Database 10.

Figure 7:
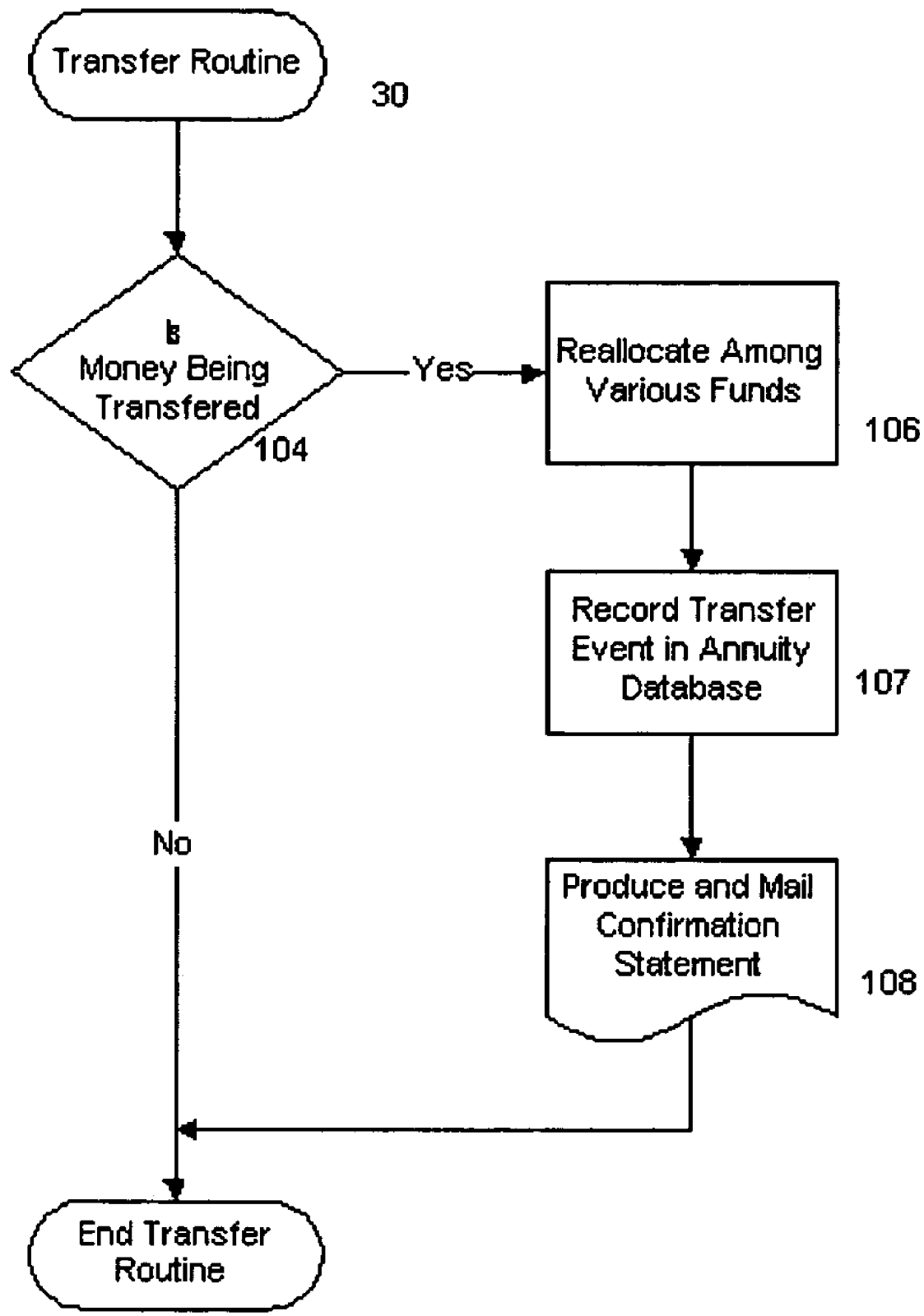
FIG. 7 is a flow chart illustrating the operation of the Transfer Routine of the Annuity Module of FIG. 2.

Because the annuity is a variable annuity, the contractowner can transfer money between the various mutual fund subaccounts. This functionality is handled by the Transfer Routine 30. A flow chart of the Transfer Routine 30 is provided in FIG. 7. If a request is received to transfer money 104 between fund subaccounts, the money is reallocated among the various funds as has been requested 106 and recorded in the Annuity Database 107. A confirmation statement will then be printed and mailed out to the contractowner 108.

Figure 8:
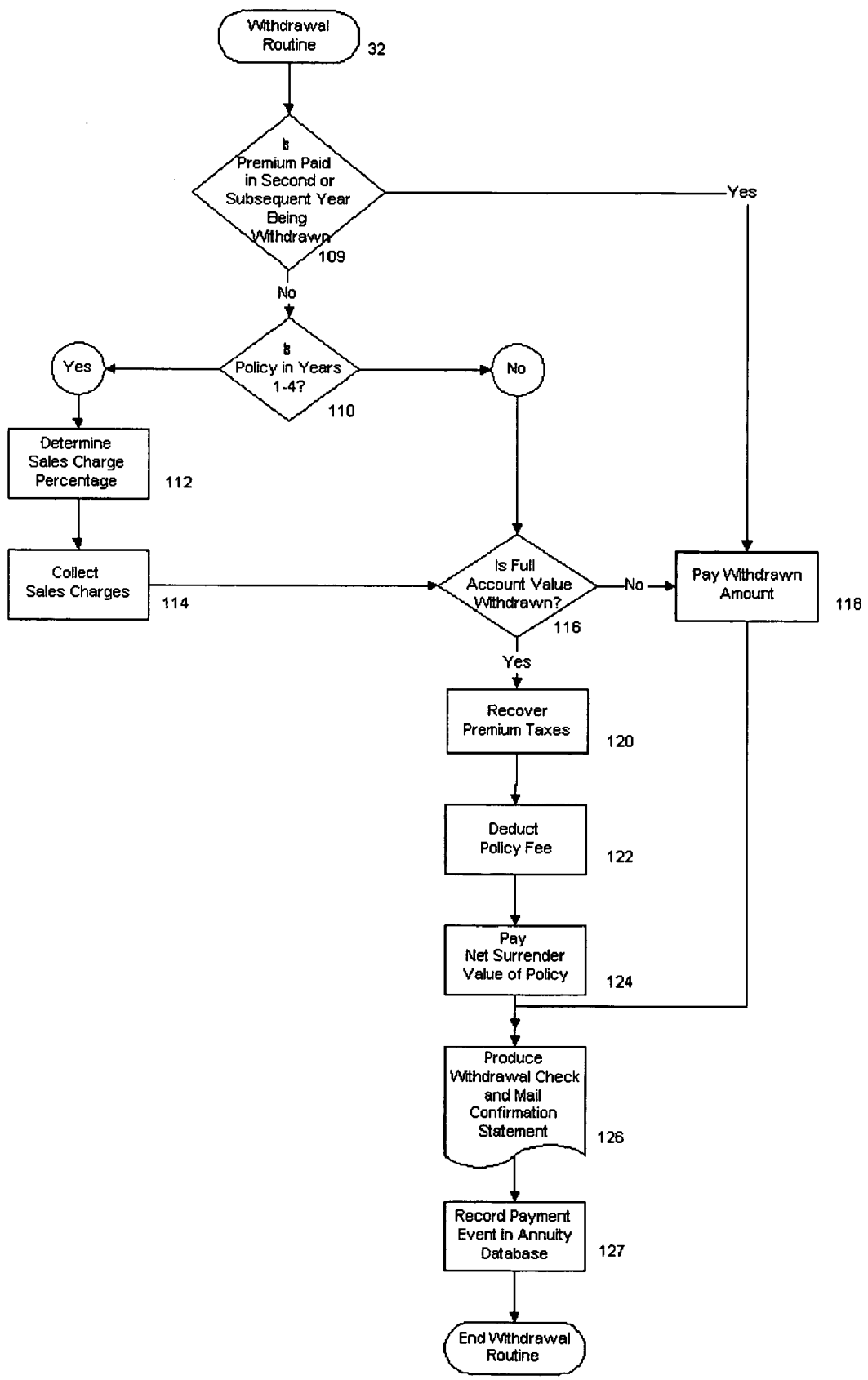
FIG. 8 is a flow chart illustrating the operation of the Surrender Routine of the Annuity Module of FIG. 2.

Along with transferring money between various fund subaccounts, the contractowner can also withdraw all or some of the money in his/her account. However, as discussed above, there are charges associated with such withdrawal. The Withdrawal Routine 32 is used to process these withdrawal charges. A flow chart of the Withdrawal Routine 32 is provided in FIG. 8. Once the contractowner has provided written notification of his or her desire to withdraw money, a determination is made as to whether a premium paid during the second year or a subsequent year is being withdrawn 109. Withdrawals are made on a last in-first out basis in order to minimize the withdrawal charge. If so, then, in accordance with the preferred embodiment of the present invention, the payment is made to contractowner without any charges being assessed 118. Next, a determination is made as to whether the contract is in its first four years 110. In accordance with the preferred embodiment of the present invention, if the contract is in the first four years, a withdrawal charge is assessed against any money that is withdrawn which had been paid in the first contract year. The withdrawal charge percentage is determined with reference to the contract year 112. In the preferred embodiment, in the first contract year the withdrawal charge is 3% of the amount withdrawn. In the second, third, and fourth contract years the withdrawal charges are 2%, 1%, and 1% of the amount withdrawn, respectively. The withdrawal charge is then deducted from the amount paid to the contractowner 114. In the preferred embodiment, in the first four contract years, the contractowner may make a partial withdrawal, without incurring a sales charge, of an amount equal to the greater of: (a) the excess of the accumulated value on the date of withdrawal over the net premium payments made in the first contract year; or (b) 10% of the total premium payments made during the first contract year, minus the aggregate amount of all prior partial withdrawals made during the current contract year.

Before the contractowner is paid, a determination is made as to whether the entire account value is being withdrawn 116. If the entire contract value is not being withdrawn, then the withdrawal amount is paid to the contractowner 118. If the entire accumulated value of the contract is being withdrawn, then the amount paid is further reduced. First, any premium taxes that have been paid by the insurance company are recovered 120. In addition, the appropriate contract fee is deducted from the proceeds 122 since contract fees are not charged until the end of the contract year. These two items, in addition to any withdrawal charges assessed, are deducted from the accumulated value, and the net surrender value of the contract is paid out 124. A confirmation statement and a check are then produced and mailed out 126 and the withdrawal event is recorded in the annuity database 127.

Figure 9:
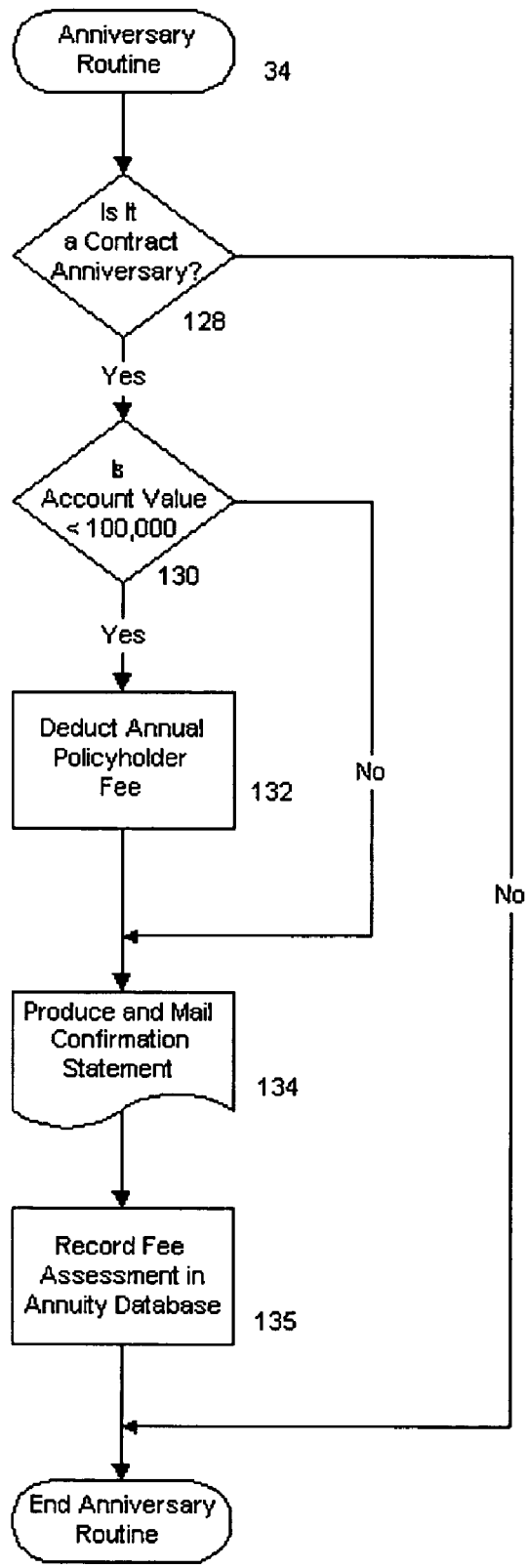
FIG. 9 is a flow chart illustrating the operation of the Anniversary Routine of the Annuity Module of FIG. 2.

At the end of each contract year, a contract fee is charged to each contractowner. The Anniversary Routine 34 of the Annuity Module 20 is used to process this charge. A flow chart of the Anniversary Routine 34 is provided in FIG. 9. The first step is to determine whether a contract is at an anniversary 128 by checking the contract date in the Annuity Database 10. If it is not a contract anniversary, then the Anniversary Routine 34 is terminated. If the contract is at an anniversary, a determination is made as to whether the account value is less than $100,000 130. If the account value is greater than $100,000, then no annual fee is charged. If the account value is less than $100,000, then an annual fee is charged 132. The account value threshold is discretionary and will vary from issuer to issuer. At every contract anniversary, a confirmation statement is also sent out to the contractowner 134 which details all account activity and shows the value of the account. The Annuity Database 135 is also updated to reflect any contract fee assessed.

Figure 10:
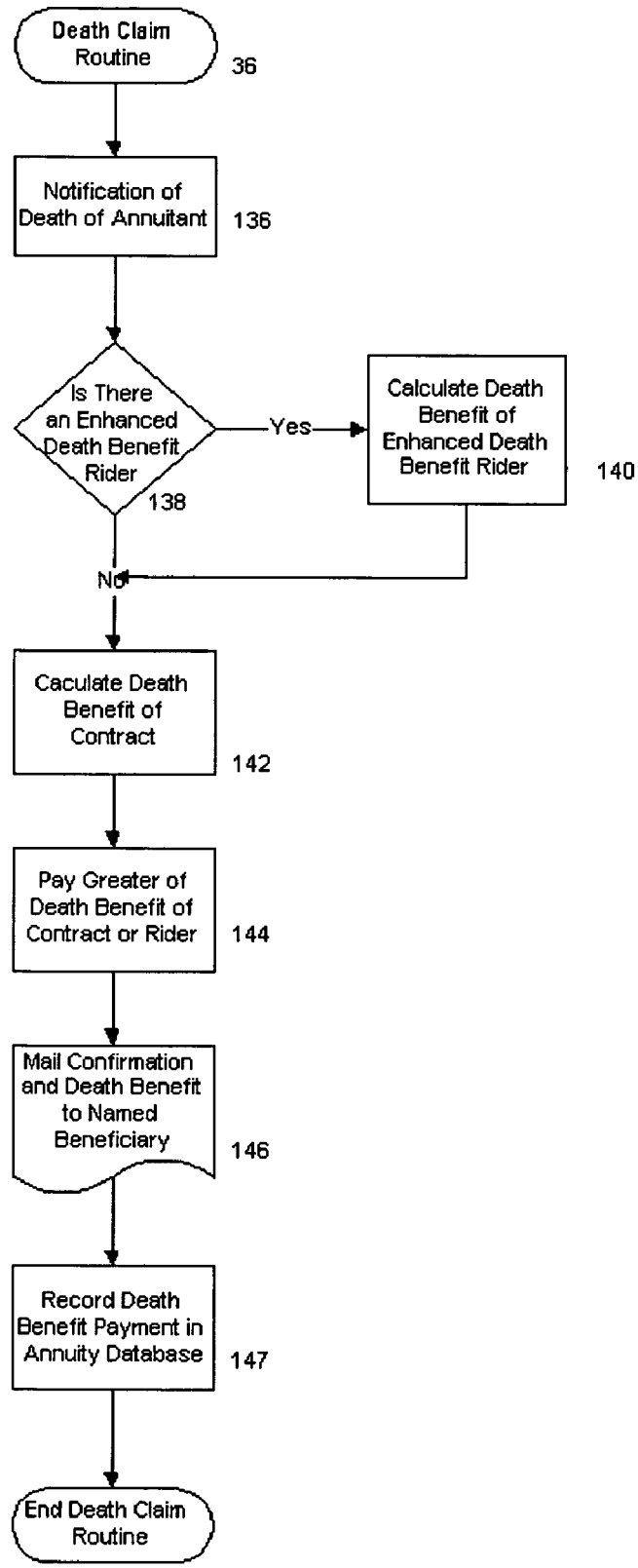
FIG. 10 is a flow chart illustrating the operation of the Death Claim Routine of the Annuity Module of FIG. 2.

If the annuitant dies, the beneficiary will receive any death benefit. The Death Claim Routine 36 is used to process any payments to the beneficiary. A flow chart of the Death Claim Routine 36 is provided in FIG. 10. Once notification of the death of the annuitant is received by the system 136 and the Death Claim Routine 36 is activated, the type of death benefit is first determined by the system. If the contract includes an enhanced death benefit rider 138, the death benefit payable under this rider is calculated 140. The death benefit of the contract is then also calculated 142. The amount, if any, paid out is the greater of the death benefit of the contract and the death benefit of the rider 144. A confirmation statement and a check are then produced and mailed to the named beneficiary 146 and the payment is recorded in the Annuity Database 147.

Figure 11:
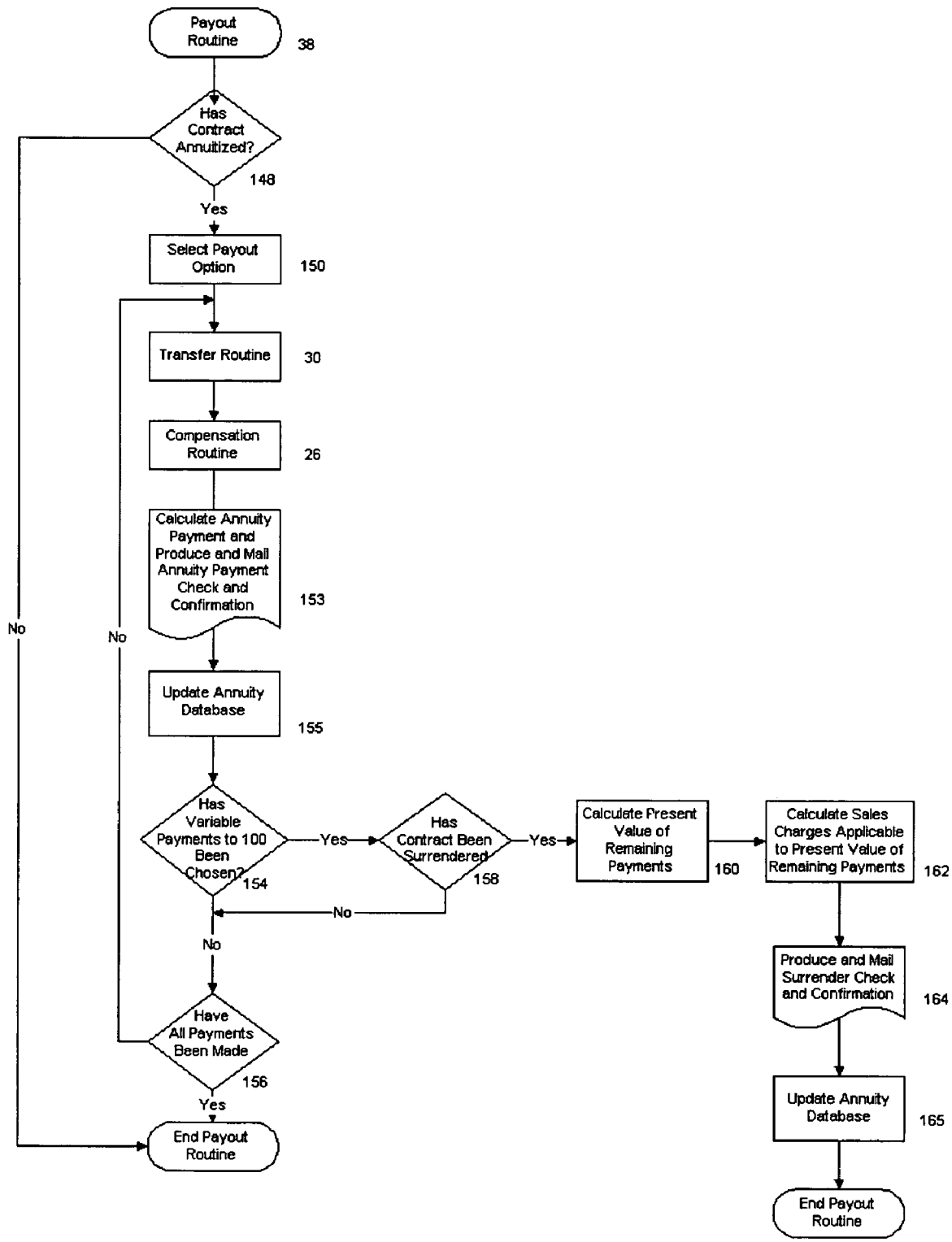
FIG. 11 is a flow chart illustrating the operation of the Payout Routine of the Annuity Module of FIG. 2.

Referring to FIG. 11, a flow chart of the Payout Routine 38, which is used to process payout options, is provided. Initially, a determination is made as to whether the contract has been annuitized by checking the Annuity Database 148. If it has not, then the payout routine is terminated. If, however, the contract has been annuitized, then the payout option selected by the contractowner 150 is determined from the Annuity Database 10. In accordance with the preferred embodiment of the present invention, the payout options are (1) a life annuity without a guaranteed period, (2) a life annuity with a 10 year guaranteed payout period, (3) an option where variable payments are made until age 100, and (4) a joint and survivor option that will make reduced payments to the survivor. However, the present invention is not limited to the foregoing payout options and, in fact, any other payout options may be used in accordance with the present invention.

While in the payout phase, money can be transferred between the various fund subaccounts. If the contractowner requests a transfer, the Transfer Routine 30 processes the request. Thus, if a request is received to transfer money and the request meets the rules of the contract 104, the money is reallocated among the various fund subaccounts as has been requested 106. Compensation is also paid to distributors for as long as annuity payments are being made. The Compensation Routine 26 processes these compensation payments.

The payment amount based on the payout option selected is then calculated and a check and confirmation statement are generated and mailed to the annuitant 153 and the Annuity Database is updated 155. If the variable payments to age 100 has not been selected, the payout routine will continue in this manner until all payments have been made 156.

Typically, once the contract is annuitized the contract may not be surrendered. However, if the variable payments to age 100 option is chosen 154, an option to surrender the contract is preferably provided to the contractowner. If there is a request to surrender the contract 158, the present value of the remaining payments needs to be calculated 160. In addition, in the preferred embodiment, if the contract had annuitized in the first four contract years, sales charges were waived at the time of annuitization. The present value of the remaining payments is reduced by a portion of the sales charge that was waived. The amount that was waived thus needs to be calculated 162. The amount waived is then multiplied by the ratio of the number of payments that have not yet been paid to the total number of payments that were to be paid at the time of annuitization. This is the amount by which the present value of the remaining payments is reduced. A confirmation and a check for the surrender value are then produced and mailed out 164 and the Annuity Database is updated 165.

Thus, in accordance with the foregoing a system for and method of variable annuity contract administration are provided which achieve the objects of the present invention. Modifications to the above would be obvious to those of ordinary skill in the art, but would not bring the invention so modified beyond the scope of the appended claims.

What is claimed is:

1. A computer implemented method of administering a variable annuity contract, said method comprising:
   issuing a variable annuity contract;
   structuring seller compensation for the variable annuity contract on an asset-basis to be paid incrementally;
   assigning a bonus investment credit for the variable annuity contract;
   limiting, by a computer, withdrawal charges of the variable annuity contract to be less than or equal to the bonus investment credit and greater than zero, over a period of time;

storing the structured seller compensation, the assigned bonus investment credit, and the limited withdrawal charge on a computer system that administers annuities;

processing, by the computer, the issued variable annuity contract with the structured seller compensation, the assigned bonus investment credit, and the limited withdrawal charges; and generating an output on the basis of the processing in administering the variable annuity contract.

2. The method of claim 1 wherein the bonus investment credit includes a premium-based bonus investment credit.

3. The method of claim 1 further comprising calculating a daily mortality and expense risk for the variable annuity contract.

4. The method of claim 1 wherein the withdrawal charges for a first contract year are limited to the bonus investment credit.

5. The method of claim 1 further storing subaccount allocation information and allocating contract premiums based on the allocation information.

6. The method of claim 1 wherein the withdrawal charges decrease over the period of time from the bonus investment credit towards zero, non-inclusive of zero.

7. A system for administering a variable annuity contract, said system comprising:
a computer configured to assign a bonus investment credit for the variable annuity contract, limit over a plurality of time periods a withdrawal charge of the variable annuity contract that is determined before withdrawal of an amount of money from the variable annuity contract, to less than or equal to the bonus investment credit and greater than zero percent of the amount to be withdrawn, and process the variable annuity contract with the assigned bonus investment credit, and the limited withdrawal charge.

8. The system of claim 7 wherein the bonus investment credit includes a premium-based bonus investment credit.

9. The system of claim 7 wherein the computer is configured to calculate a daily mortality and expense risk for the variable annuity contract.

10. The system of claim 7, wherein the computer is further configured to structure seller compensation for the variable annuity contract on an asset-basis to be paid incrementally.

11. The system of claim 7 wherein the computer stores subaccount allocation information and allocates contract premiums based on the allocation information.

12. The system of claim 7 wherein another withdrawal charge of the variable annuity contract, that is determined at a later time period that is later than an earlier time period of the limited withdrawal charge, is less than or equal to the limited withdrawal charge.

13. A system for administering a variable annuity contract, said system comprising:
processing means for issuing a variable annuity contract, structuring seller compensation for the variable annuity contract on an asset-basis to be paid incrementally, assigning a bonus investment credit for the variable annuity contract, limiting withdrawal charges of the variable annuity contract to less than or equal to the bonus investment credit over a period of time, wherein at least one of the withdrawal charges is greater than zero, storing the structured seller compensation, the assigned bonus investment credit, and the limited withdrawal charge on a computer system that administers annuities, and processing the issued variable annuity contract with the structured seller compensation, the assigned bonus investment credit, and the limited withdrawal charges; and memory means for storing and updating information for the issued contract.

14. The system of claim 13 wherein the bonus investment credit includes a premium-based bonus investment credit.

15. The system of claim 13 wherein the processing means is configured to calculate a daily mortality and expense risk for the variable annuity contract.

16. The system of claim 13 wherein the withdrawal charges for a first contract year are limited to the bonus investment credit.

17. The system of claim 13 wherein the memory means stores subaccount allocation information and the processing means allocates contract premiums based on the allocation information.

18. The system of claim 13 wherein a first withdrawal charge of the withdrawal charges is 3% of the amount withdrawn in a first contact year, wherein a second withdrawal charge of the withdrawal charges is 2% in a second contract year, wherein a third withdrawal charge of the withdrawal charges is 1% in a third contract year, wherein a fourth withdrawal charge of the withdrawal charges is 1% in a fourth contract year, and wherein following the fourth contract year, a fifth withdrawal charge of the withdrawal charges is 0%.

19. A computer implemented method of administering a variable annuity contract, said method comprising:
issuing a variable annuity contract;
structuring seller compensation for the variable annuity contract on an asset-basis of an accumulated account value to be paid incrementally;
assigning a bonus investment credit for the variable annuity contract;
limiting, by a computer, withdrawal charges of the variable annuity contract to less than or equal to the bonus investment credit, wherein at least one of the withdrawal charges is greater than 0% before a contract year, and wherein another one of the withdrawal charges is 0% in the contract year;
storing the structured seller compensation, the assigned bonus investment credit, and the limited withdrawal charges on a computer system that administers annuities; and
processing, by the computer, the issued variable annuity contract with the structured seller compensation, the assigned bonus investment credit, and the limited withdrawal charges.

20. A system for administering variable annuity contracts, the system comprising:
a data storage device having data relating to at least one variable annuity contract stored therein, the data including
a bonus investment credit percentage;
one or more withdrawal charge percentages for one or more contract years, each withdrawal charge percentage being less than or equal to the bonus investment credit percentage, wherein at least one of the withdrawal charge percentages is greater than zero;
an asset-based compensation percentage for each of a plurality of contract years;
a premium amount paid in a first contract year; and
a processor operatively coupled to the data storage device, the processor configured to read the bonus investment credit percentage, the premium amount, the one or more withdrawal charge percentages, and the asset-based compensation percentage from the data storage device;

to calculate a bonus investment credit by multiplying the premium amount by the bonus investment credit percentage; to calculate a withdrawal charge based on the one or more withdrawal charge percentages; and to calculate an asset-based compensation based on the asset-based compensation percentage, wherein the processor generates data representative of the calculated bonus investment credit percentage, calculated withdrawal charge percentages, or calculated asset-based compensation percentage.

21. The system of claim 20 further comprising an annuity module having instructions for processing at least one of a contract issue routine, a payment processing routine, a compensation risk routine, a mortality and expense risk routine, a free look routine, a transfer routine, a withdrawal routine, an anniversary routine, a death claim routine and a payout routine.

22. A computer implemented method of administering of variable annuity contracts, said method comprising the steps:
   storing data in a database related to at least one variable annuity account, the at least one account having an associated bonus investment credit percentage, associated withdrawal charge percentages for each of a plurality of contract years, each withdrawal charge percentage being less than or equal to said bonus investment credit percentage, wherein at least one of the withdrawal charge percentages is greater than zero, and an asset-based compensation percentage for a plurality of contract years, wherein the data includes the bonus investment credit percentage, the associated withdrawal charge percentage, the asset-based compensation percentage, and a premium amount paid;
   providing an annuity module having computer readable instructions implemented to run on a computer;
   using the instructions, processing at least one of a contract issue routine, a payment processing routine, a compensation risk routine, a mortality and expense risk routine, a free look routine, a transfer routine, a withdrawal routine, an anniversary routine, a death claim routine and a payout routine; and
   in response to using the instructions, generating data representative of an output of the contract issue routine, a payment processing routine, a compensation risk routine, a mortality and expense risk routine, a free look routine, a transfer routine, a withdrawal routine, an anniversary routine, a death claim routine and a payout routine.

23. The method of claim 22, wherein the free look routine comprises:
   storing a period of time in the database during which a contract owner has the right to exercise a free look provision;
   checking the database to determine whether the free look provision has been exercised during the period of time; and
   if the free look provision has been exercised during the period of time, calculating the amount of money to return.

24. The method of claim 23, wherein the amount of money to return is equal to the premium amount.

25. The method of claim 24 further comprising closing the account and recording the closing of the account in the database.

26. The method of claim 23, wherein the amount of money to return is less than the premium amount.

27. The method of claim 26 wherein the step of calculating the amount of money further comprises subtracting from the premium amount at least one of a value of a bonus investment credit and a mortality and expense risk charge.

28. The method of claim 27 further comprising reclaiming an amount of asset based compensation from a distributor.

29. The method of claim 28 further comprising closing the account and recording the closing of the account in the database.

30. The method of claim 22 further comprising:
   reading the bonus investment credit percentage from the database;
   reading the premium amount from the database;
   reading at least one of the withdrawal charge percentages from the database,
   reading the asset-based compensation percentage from the database;
   calculating a bonus investment credit by multiplying the premium amount by the bonus investment credit percentage;
   calculating a withdrawal charge based on the at least one of the withdrawal charge percentages; and
   calculating an asset-based compensation based on the asset-based compensation percentage.

31. A method for administering variable annuity contracts, comprising:
   relating data within a storage device to at least one variable annuity contract stored therein, the data including
   a bonus investment credit percentage;
   one or more withdrawal charge percentages for one or more contract years, each withdrawal charge percentage being less than or equal to the bonus investment credit percentage, wherein at least one of the withdrawal charge percentages is greater than zero;
   an asset-based compensation percentage for each of a plurality of contract years;
   a premium amount paid in a first contract year; and
   operatively coupling a processor to the data storage device, the processor configured to read the bonus investment credit percentage, the premium amount, the one or more withdrawal charge percentages, and the asset-based compensation percentage from the data storage device; to calculate a bonus investment credit by multiplying the premium amount by the bonus investment credit percentage; to calculate a withdrawal charge based on the one or more withdrawal charge percentages; and to calculate an asset-based compensation based on the asset-based compensation percentage, wherein the processor generates data representative of the calculated bonus investment credit, calculated withdrawal charge, or calculated asset-based compensation.

32. The method of claim 31 further comprising:
   processing at least one of a contract issue routine, a payment processing routine, a compensation risk routine, a mortality and expense risk routine, a free look routine, a transfer routine, a withdrawal routine, an anniversary routine, a death claim routine and a payout routine.

33. A system for administering of variable annuity contracts, the system comprising:
   a database stores data related to at least one variable annuity account, the at least one account having an associated bonus investment credit percentage, associated withdrawal charge percentages for each of a plurality of contract years, each withdrawal charge percentage being less than or equal to said bonus investment credit percentage, and an asset-based compensation percentage for a plurality of contract years, wherein at least one of the withdrawal charge percentages is greater than zero, wherein the data includes the bonus investment credit percentage, the associated withdrawal charge percentage, the asset-based compensation percentage, and a premium amount paid;

a computer provides an annuity module having computer readable instructions implemented to run on said computer, wherein the computer is configured using the instructions to process at least one of a contract issue routine, a payment processing routine, a compensation risk routine, a mortality and expense risk routine, a free look routine, a transfer routine, a withdrawal routine, an anniversary routine, a death claim routine and a payout routine; and generate data representative of an output of the contract issue routine, a payment processing routine, a compensation risk routine, a mortality and expense risk routine, a free look routine, a transfer routine, a withdrawal routine, an anniversary routine, a death claim routine and a payout routine.

34. The system of claim 33, wherein said database stores a period of time representative of a time during which a contract owner has the right to exercise a free look provision and said computer is configured to check the database to determine whether the free look provision has been exercised during the period of time; and if the free look provision has been exercised during the period of time, calculating the amount of money to return to the contract owner.

35. The system of claim 34, wherein the amount of money to return is equal to the premium amount.

36. The system of claim 35 further comprises closing the account and recording the closing of the account in the database.

37. The system of claim 34, wherein the amount of money to return is less than the premium amount.

38. The system of claim 37 wherein calculating the amount of money by the computer comprises subtracting from the premium amount at least one of a value of a bonus investment credit and a mortality and expense risk charge.

39. The system of claim 38 wherein the computer is further configured to reclaim an amount of asset based compensation from a distributor.

40. The system of claim 39 wherein the computer is further configures to close the account and record the closing of the account.

41. The system of claim 33 wherein the computer is configured to:
read the bonus investment credit percentage;
read the premium amount;
read at least one of the withdrawal charge percentages,
read the asset-based compensation percentage;
calculate a bonus investment credit by multiplying the premium amount by the bonus investment credit percentage;
calculate a withdrawal charge based on the at least one of the withdrawal charge percentages; and
calculate an asset-based compensation based on the asset-based compensation percentage.

42. The method of claim 1, wherein structuring the seller compensation for the variable annuity contract on the asset-basis to be paid incrementally comprises:
structuring the seller compensation for the variable annuity contract on the asset-basis to be paid over a plurality of years.

43. The method of claim 1, wherein structuring the seller compensation for the variable annuity contract on the asset-basis to be paid incrementally comprises:
structuring the seller compensation for the variable annuity contract on the asset-basis to be paid at a percentage of a premium in the first contract year and at another percentage of a current accumulated account value of the contract for at least one year thereafter payable on a quarterly basis.

44. The system of claim 7, wherein structuring the seller compensation for the variable annuity contract on the asset-basis to be paid incrementally comprises:
structuring the seller compensation for the variable annuity contract on the asset-basis to be paid over a plurality of years.

45. The system of claim 7, wherein structuring the seller compensation for the variable annuity contract on the asset-basis to be paid incrementally comprises:
structuring the seller compensation for the variable annuity contract on the asset-basis to be paid at a percentage of a premium in the first contract year and at another percentage of a current accumulated account value of the contract for at least one year thereafter payable on a quarterly basis.

46. The system of claim 13, wherein structuring the seller compensation for the variable annuity contract on the asset-basis to be paid incrementally comprises:
structuring the seller compensation for the variable annuity contract on the asset-basis to be paid over a plurality of years.

47. The system of claim 13, wherein structuring the seller compensation for the variable annuity contract on the asset-basis to be paid incrementally comprises:
structuring the seller compensation for the variable annuity contract on the asset-basis to be paid at a percentage of a premium in a first contract year and at another percentage of a current accumulated account value of the contract for at least one year thereafter payable on a quarterly basis.

48. The method of claim 19, wherein structuring the seller compensation for the variable annuity contract on the asset-basis of the accumulated account value to be paid incrementally comprises:
structuring the seller compensation for the variable annuity contract on the asset-basis to be paid over a plurality of years.

49. The method of claim 19, wherein structuring the seller compensation for the variable annuity contract on the asset-basis of the accumulated account value to be paid incrementally comprises:
structuring the seller compensation for the variable annuity contract on the asset-basis to be paid in a first contract year and for at least one year thereafter payable on a quarterly basis.

50. The system of claim 20, wherein the asset-based compensation percentage is for a first contract year and for at least one year thereafter payable on a quarterly basis.

51. The method of claim 22, wherein the asset-based compensation percentage is for a first contract year and for at least one year thereafter payable on a quarterly basis.

52. The method of claim 31, wherein the asset-based compensation percentage is for a first contract year and for at least one year thereafter payable on a quarterly basis.

53. The system of claim 33, wherein the asset-based compensation percentage is for a first contract year and for at least one year thereafter payable on a quarterly basis.

* * * * *